US012634593B2

(12) United States Patent
Nakajima

(10) Patent No.: US 12,634,593 B2
(45) Date of Patent: May 19, 2026

(54) IMAGING APPARATUS CONFIGURED TO GENERATE RAW IMAGE, CONTROL METHOD, AND STORAGE MEDIUM

(71) Applicant: CANON KABUSHIKI KAISHA, Tokyo (JP)

(72) Inventor: Michinori Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 18/753,479

(22) Filed: Jun. 25, 2024

(65) Prior Publication Data

US 2024/0348940 A1 Oct. 17, 2024

Related U.S. Application Data

(63) Continuation of application No. PCT/JP2022/047272, filed on Dec. 22, 2022.

(30) Foreign Application Priority Data

Dec. 28, 2021 (JP) ................................ 2021-214768

(51) Int. Cl.
*H04N 23/84* (2023.01)
*H04N 7/015* (2006.01)
*H04N 23/667* (2023.01)

(52) U.S. Cl.
CPC ............ *H04N 23/84* (2023.01); *H04N 7/015* (2013.01); *H04N 23/667* (2023.01)

(58) Field of Classification Search
CPC ...... H04N 23/84; H04N 7/015; H04N 23/667; H04N 5/772; H04N 21/4223; H04N 21/43635; H04N 21/4402; H04N 9/8042; H04N 9/8047; H04N 23/80; H04N 9/8205; H04N 1/32101; H04N 23/60
See application file for complete search history.

(56) References Cited

U.S. PATENT DOCUMENTS

| | | | | |
|---|---|---|---|---|
| 2012/0315011 | A1 | 12/2012 | Messmer | |
| 2018/0176640 | A1 | 6/2018 | Eyer | |
| 2019/0122064 | A1* | 4/2019 | Ishikawa | H04N 23/80 |
| 2020/0336645 | A1 | 10/2020 | Fukuda | |
| 2021/0306563 | A1* | 9/2021 | Ishida | H04N 23/80 |
| 2021/0385375 | A1* | 12/2021 | Nishiguchi | H04N 23/64 |

(Continued)

FOREIGN PATENT DOCUMENTS

| | | | |
|---|---|---|---|
| JP | 2013520874 | A | 6/2013 |
| JP | 2013153410 | A | 8/2013 |

(Continued)

*Primary Examiner* — Christopher K Peterson
(74) *Attorney, Agent, or Firm* — Canon U.S.A., Inc. IP Division

(57) ABSTRACT

An imaging apparatus includes a first generation unit configured to generate a RAW image, a second generation unit configured to generate metadata corresponding to the RAW image, an arrangement unit configured to arrange the RAW image generated by the first generation unit and the metadata generated by the second generation unit in an image area in a video format in luminance-chrominance-chrominance (YCC) 4:2:2 format, and an output unit configured to output the RAW image and the metadata arranged in the image area in the video format in YCC 4:2:2 format by the arrangement unit.

10 Claims, 10 Drawing Sheets

(56) References Cited

U.S. PATENT DOCUMENTS

| | | | | |
|---|---|---|---|---|
| 2022/0053118 | A1 | 2/2022 | Nashizawa | |
| 2022/0279110 | A1* | 9/2022 | Suzuki ................. | H04N 21/235 |
| 2023/0114790 | A1 | 4/2023 | Kubo | |

FOREIGN PATENT DOCUMENTS

| | | | |
|---|---|---|---|
| JP | 2020141335 | A | 9/2020 |
| JP | 2020178292 | A | 10/2020 |
| JP | 2020182186 | A | 11/2020 |
| WO | 2021187292 | A1 | 9/2021 |

* cited by examiner

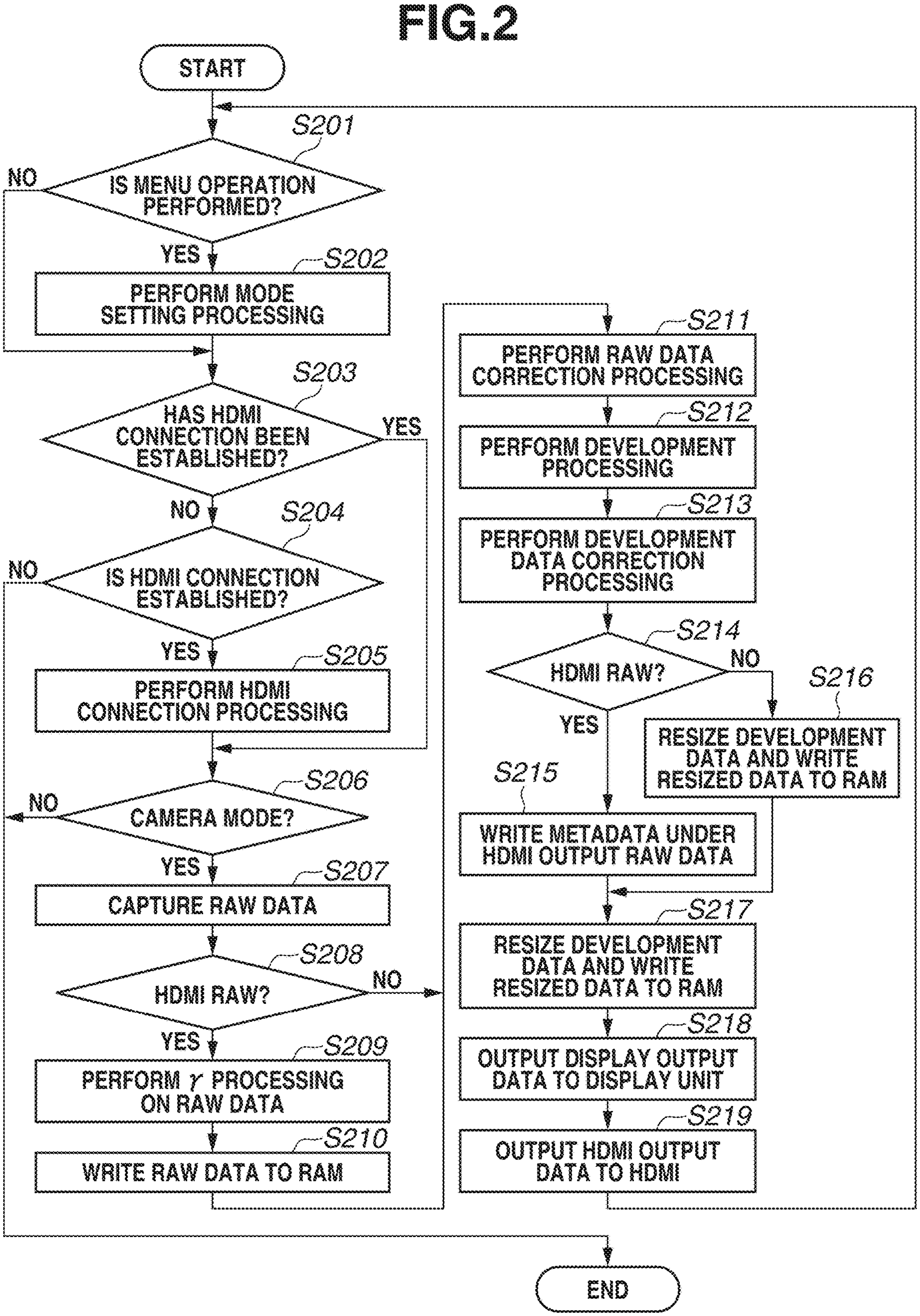

FIG.2

START

S201
IS MENU OPERATION PERFORMED? — NO

YES

S202
PERFORM MODE SETTING PROCESSING

S203
HAS HDMI CONNECTION BEEN ESTABLISHED? — YES

NO

S204
IS HDMI CONNECTION ESTABLISHED? — NO

YES

S205
PERFORM HDMI CONNECTION PROCESSING

S206
CAMERA MODE? — NO

YES

S207
CAPTURE RAW DATA

S208
HDMI RAW? — NO

YES

S209
PERFORM γ PROCESSING ON RAW DATA

S210
WRITE RAW DATA TO RAM

S211
PERFORM RAW DATA CORRECTION PROCESSING

S212
PERFORM DEVELOPMENT PROCESSING

S213
PERFORM DEVELOPMENT DATA CORRECTION PROCESSING

S214
HDMI RAW? — NO

S216
RESIZE DEVELOPMENT DATA AND WRITE RESIZED DATA TO RAM

YES

S215
WRITE METADATA UNDER HDMI OUTPUT RAW DATA

S217
RESIZE DEVELOPMENT DATA AND WRITE RESIZED DATA TO RAM

S218
OUTPUT DISPLAY OUTPUT DATA TO DISPLAY UNIT

S219
OUTPUT HDMI OUTPUT DATA TO HDMI

END

FIG.3B

| Effective Pixel Area | L/R Additional pixel Area | Up/Lo Additional pixel Area | Total Pixel Area | Bit |
|---|---|---|---|---|
| 4096 × 2160 | 12 | 8 | 4120 × 2176 | 12 |

|  | 1 | 2 | 3 | 4 | ... | 4119 | 4120 |
|---|---|---|---|---|---|---|---|
| 1 | R (0, 0) | Gr (0, 0) | R (0, 1) | Gr (0, 1) | ... | R (0, 2059) | Gr (0, 2059) |
| 2 | Gb (0, 0) | B (0, 0) | Gb (0, 1) | B (0, 1) | ... | Gb (0, 2059) | B (0, 2059) |
| 3 | R (1, 0) | Gr (1, 0) | R (1, 1) | Gr (1, 1) | ... | R (1, 2059) | Gr (1, 2059) |
| 4 | Gb (1, 0) | B (1, 0) | Gb (1, 1) | B (1, 1) | ... | Gb (1, 2059) | B (1, 2059) |
| ... | ... | ... | ... | ... | | ... | ... |
| 2173 | R (1086, 0) | Gr (1086, 0) | R (1086, 1) | Gr (1086, 1) | ... | R (1086, 2059) | Gr (1086, 2059) |
| 2174 | Gb (1086, 0) | B (1086, 0) | Gb (1086, 1) | B (1086, 1) | ... | Gb (1086, 2059) | B (1086, 2059) |
| 2175 | R (1087, 0) | Gr (1087, 0) | R (1087, 1) | Gr (1087, 1) | ... | R (1087, 2059) | Gr (1087, 2059) |
| 2176 | Gb (1087, 0) | B (1087, 0) | Gb (1087, 1) | B (1087, 1) | ... | Gb (1087, 2059) | B (1087, 2059) |

400

401

402

500

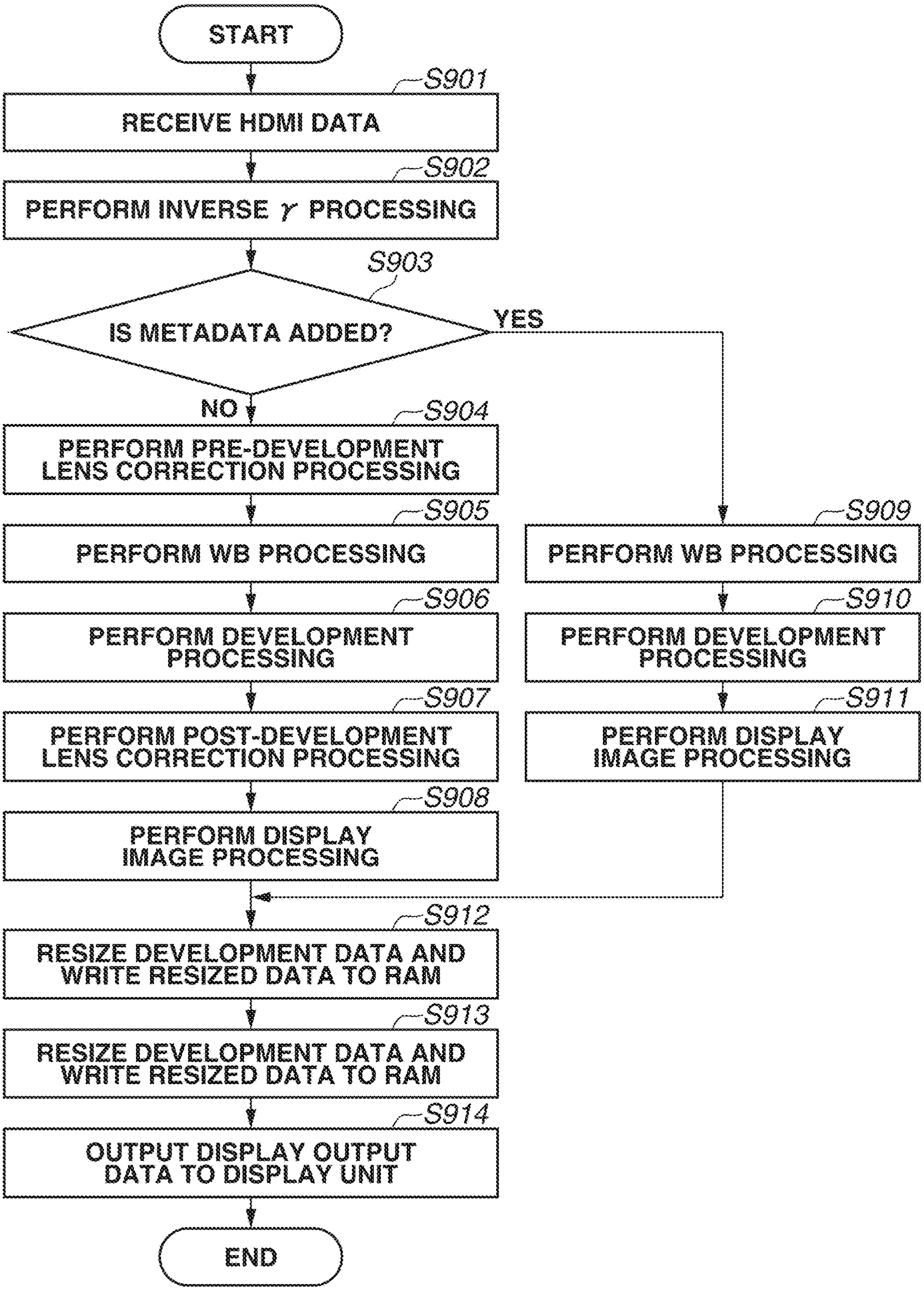

FIG.9

START

S901
RECEIVE HDMI DATA

S902
PERFORM INVERSE γ PROCESSING

S903
IS METADATA ADDED?          YES

NO

S904
PERFORM PRE-DEVELOPMENT
LENS CORRECTION PROCESSING

S905
PERFORM WB PROCESSING

S906
PERFORM DEVELOPMENT
PROCESSING

S907
PERFORM POST-DEVELOPMENT
LENS CORRECTION PROCESSING

S908
PERFORM DISPLAY
IMAGE PROCESSING

S909
PERFORM WB PROCESSING

S910
PERFORM DEVELOPMENT
PROCESSING

S911
PERFORM DISPLAY
IMAGE PROCESSING

S912
RESIZE DEVELOPMENT DATA AND
WRITE RESIZED DATA TO RAM

S913
RESIZE DEVELOPMENT DATA AND
WRITE RESIZED DATA TO RAM

S914
OUTPUT DISPLAY OUTPUT
DATA TO DISPLAY UNIT

END

IMAGING APPARATUS CONFIGURED TO GENERATE RAW IMAGE, CONTROL METHOD, AND STORAGE MEDIUM

CROSS-REFERENCE TO RELATED APPLICATIONS

This application is a Continuation of International Patent Application No. PCT/JP2022/047272, filed Dec. 22, 2022, which claims the benefit of Japanese Patent Application No. 2021-214768, filed Dec. 28, 2021, both of which are hereby incorporated by reference herein in their entireties.

BACKGROUND OF THE INVENTION

Field of the Invention

The present invention relates to an imaging apparatus configured to generate RAW images, a control method, and a storage medium.

Background Art

Japanese Unexamined Patent Application Publication (Translation of PCT Application) No. 2013-520874 discusses a method of embedding metadata (watermark information) in one or more chrominance portions of video data and distributing the video data including the embedded metadata.

CITATION LIST

Patent Literature

PTL 1: Japanese Unexamined Patent Application Publication (Translation of PCT Application) No. 2013-520874

However, in Japanese Unexamined Patent Application Publication (Translation of PCT Application) No. 2013-520874, image degradation may occur because metadata is embedded in one or more chrominance portions of video data, which is an issue. A greater amount of embedded metadata induces a higher image degradation, so that the amount of metadata to be embedded is limited.

SUMMARY OF THE INVENTION

Thus, the present invention is directed to making it possible to output image data and metadata corresponding to the image data without causing image degradation.

To address the foregoing issue, an imaging apparatus includes a first generation unit configured to generate a RAW image, a second generation unit configured to generate metadata corresponding to the RAW image, an arrangement unit configured to arrange the RAW image generated by the first generation unit and the metadata generated by the second generation unit in an image area in a video format in luminance-chrominance-chrominance (YCC) 4:2:2 format, and an output unit configured to output the RAW image and the metadata arranged in the image area in the video format in YCC 4:2:2 format by the arrangement unit.

Further features of the present invention will become apparent from the following description of exemplary embodiments with reference to the attached drawings.

BRIEF DESCRIPTION OF THE DRAWINGS

FIG. 2 is a flowchart illustrating a process of the imaging apparatus 100 according to the first exemplary embodiment.

FIG. 3B is a diagram illustrating RAW data.

FIG. 9 is a flowchart illustrating a process of the image reception device 800 according to the first exemplary embodiment.

DESCRIPTION OF THE EMBODIMENTS

Exemplary embodiments of the present invention will be described below with reference to the drawings. It should be noted that the present invention is not limited to the exemplary embodiments described below.

First Exemplary Embodiment

Figure 1:
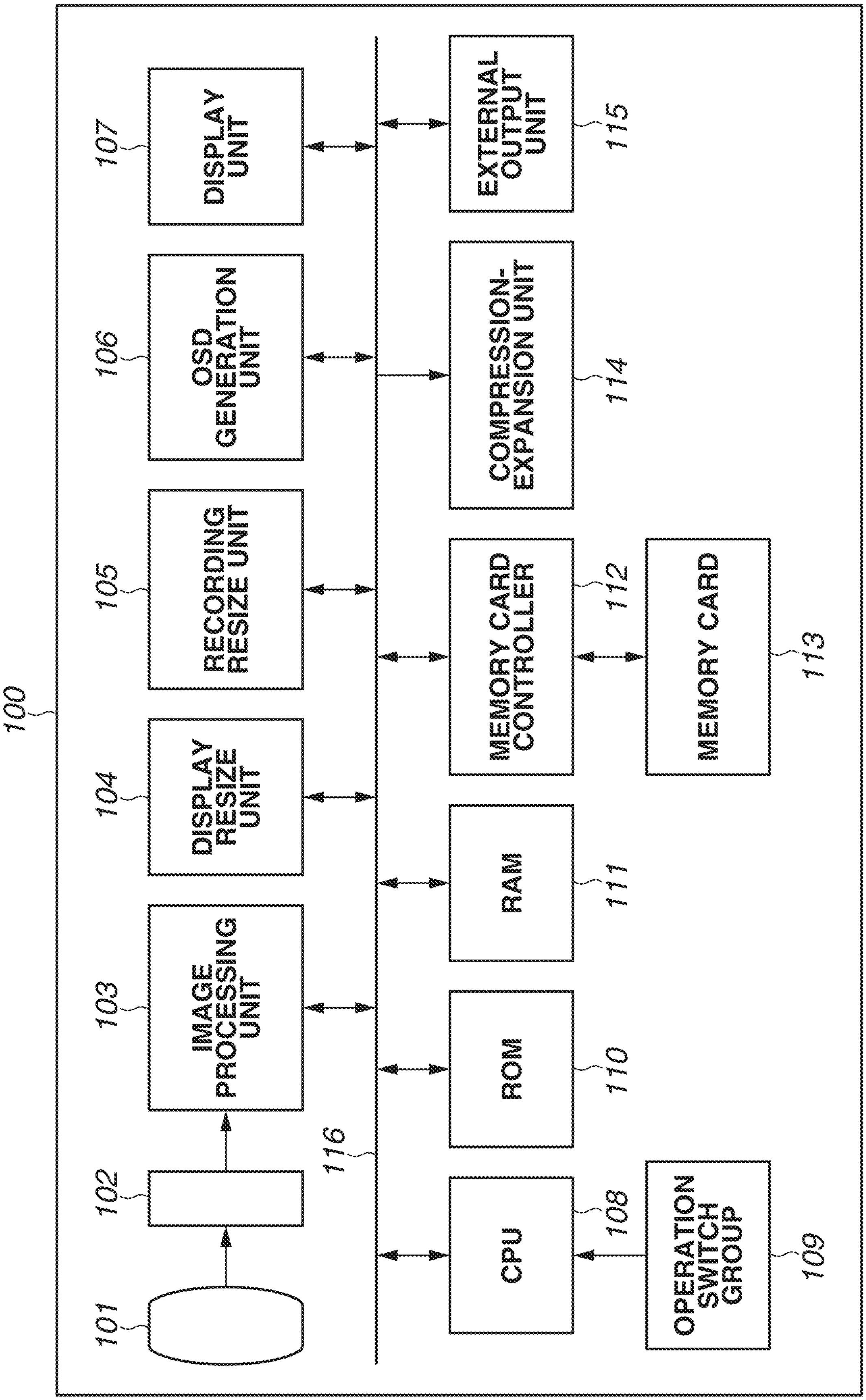
FIG. 1 is a block diagram illustrating components of an imaging apparatus 100 according to a first exemplary embodiment.

FIG. 1 is a block diagram illustrating components of an imaging apparatus 100 according to a first exemplary embodiment.

A lens unit 101 is an optical system including a fixed lens group, a zoom lens group, a diaphragm, and a correction lens group for focusing light. The correction lens group includes a function of correcting an image forming position moved according to the movement of the zoom lens group and a function of performing focus adjustment. The lens unit 101 forms a subject image on an image forming surface of an image sensor 102 described below. The lens unit 101 is attachable to and detachable from the imaging apparatus 100.

The image sensor 102 is an image sensor, such as a charge-coupled device (CCD) image sensor or a complementary metal-oxide-semiconductor (CMOS) image sensor, and converts light into charge and generates imaging signals. Imaging signals generated by the image sensor 102 are output to, for example, an image processing unit 103. As the image sensor, a so-called dual pixel type sensor may be used in which every pixel on an imaging surface includes a pair of light receiving elements capable of photoelectrically converting a pair of optical images formed through a microlens in the pixel.

The image processing unit 103 converts imaging signals output from the image sensor 102 into RAW data (RAW image). The image processing unit 103 performs RAW development processing, such as interpolation processing and image quality adjustment processing, on the converted RAW data and generates luminance-chrominance-chrominance (YCC) 4:2:2 format image data corresponding to the RAW data. In other words, RAW data according to the present exemplary embodiment is image data before the conversion of YCC 4:2:2 format image data. The RAW data (RAW image) and the YCC 4:2:2 format image data that are acquired by the image processing unit 103 are stored in a random access memory (RAM) 111. Here, the RAW data is an example of first image data, and the YCC 4:2:2 format image data is an example of second image data.

A display resize unit 104 performs resize processing on image data stored in the RAM 111 and generates resized image data. The display resize unit 104 stores the generated resized image data in the RAM 111.

A recording resize unit 105 performs resize processing on image data stored in the RAM 111 and generates recording image data. The recording resize unit 105 stores the generated recording image data in the RAM 111.

An on-screen display (OSD) generation unit 106 generates OSD data for on-screen display (OSD). The OSD generation unit 106 stores the generated OSD data in the RAM 111. The OSD data includes OSD data, such as a various settings menu, title, and time. The OSD data stored in the RAM 111 is combined with display image data stored in the RAM 111, and the resultant data is displayed on a display unit 107 and/or is externally output by an external output unit 115.

The display unit 107 is a display member for displaying the display image data and OSD. The display unit 107 is, for example, a liquid crystal panel.

A central processing unit (CPU) 108 controls the entire imaging apparatus 100.

An operation switch group 109 is an operation member with which a user inputs operations. The operation switch group 109 includes a switch (switches) for selecting one of a camera mode for imaging with a camera, a reproduction mode for reproduction, and a power-off mode for turning off the power.

A read only memory (ROM) 110 is, for example, a flash ROM and stores programs and the like that the CPU 108 executes. Some area of the ROM 110 is used to maintain a system state for backup.

The RAM 111 is a volatile memory used as workspace by the CPU 108, the image processing unit 103, and a compression-expansion unit 114.

A memory card controller 112 records, in a memory card 113, moving image data generated by the compression-expansion unit 114 and output to the RAM 111 in a format compatible with computers, such as a File Allocation Table (FAT) file system. The memory card 113 is a recording medium that is mountable on and removable from the imaging apparatus 100 and is also mountable on a computer other than the imaging apparatus 100.

The compression-expansion unit 114 generates moving image data by performing encoding (e.g., Moving Picture Experts Group (MPEG) compression) on image data stored in the RAM 111 and outputs the generated moving image data to the RAM 111.

The external output unit 115 externally outputs image data output to the RAM 111 by the image processing unit 103. The external output unit 115 is, for example, an interface compliant with the high-definition multimedia interface (HDMI®) standard or the Serial Digital Interface (SDI) standard. The external output unit 115 is capable of outputting image data with a signal conforming to the 4K60P or 2K60P standard. A bus 116 is a bus via which the components of the imaging apparatus 100 exchange data.

Next, a process of outputting RAW data and metadata corresponding to the RAW data with a video signal compliant with the HDMI standard by the imaging apparatus 100 according to the first exemplary embodiment will be described below with reference to FIG. 2. FIG. 2 is a flowchart illustrating a process of the imaging apparatus 100 according to the first exemplary embodiment. The CPU 108 of the imaging apparatus 100 executes programs stored in the ROM 110 to control processing in the flowchart in FIG. 2.

In step S201, the CPU 108 determines whether a menu operation is performed using the operation switch group 109. The menu operation is an operation of setting operations of the imaging apparatus 100, and examples of the menu operation include an operation of setting a resolution of video signals to be captured by the image sensor 102 and an operation of setting a bit rate for encoding by the compression-expansion unit 114. Through the menu operation, an HDMI RAW mode described below is also set. In a case where the CPU 108 determines that a menu operation is performed (YES in step S201), the CPU 108 stores information set by the menu operation in the RAM 111, and the processing proceeds to step S202. In a case where the CPU 108 determines that no menu operation is performed (NO in step S201), the processing proceeds to step S203.

In step S202, the CPU 108 performs mode setting processing and controls the components in the imaging apparatus 100 to change to the mode set in step S201.

In step S203, the CPU 108 refers to information stored in the RAM 111 and determines whether an HDMI connection has been established. The HDMI connection refers to a state where HDMI connection processing described below has been completed, and information about this state is stored in the RAM 111 during processing in step S205. In a case where the CPU 108 determines that an HDMI connection has been established (YES in step S203), the processing proceeds to step S206. In a case where the CPU 108 determines that no HDMI connection has been established (NO in step S203), the processing proceeds to step S204.

In step S204, the CPU 108 controls the external output unit 115 and determines whether a hot plug detection signal (HPD) in the HDMI standard is detected and whether a signal line of a Transition Minimized Differential Signaling (TMDS) signal in the HDMI standard is pulled up. In a case where the CPU 108 determines that a hot plug detection signal is detected and a signal line of a TMDS signal is pulled up (YES in step S204), the CPU 108 determines that a HDMI connection is established, and the processing proceeds to step S205. Otherwise (NO in step S204), the CPU 108 determines that no HDMI connection is established, and the process in FIG. 2 ends.

In step S205, the CPU 108 performs HDMI connection processing. In the HDMI connection processing, the CPU 108 controls the external output unit 115 and acquires Extended Display Identification Data (EDID) of a sink device connected to the external output unit 115 via HDMI. The EDID refers to information about the sink device connected via the external output unit 115 and includes video format data supported by the sink device and vendor-specific data. The CPU 108 stores the acquired EDID in the RAM 111.

In step S206, the CPU 108 determines whether the imaging apparatus 100 is in a camera mode. The camera mode is a mode in which various types of signal processing are performed on video data focused by the lens unit 101 and captured by the image sensor 102 and the resulting data is recorded in the memory card 113, displayed on the display unit 107, and/or output to the external output unit 115. Besides the camera mode, the imaging apparatus 100 also includes a reproduction mode in which video data recorded in the memory card 113 is displayed on the display unit 107 and/or output to the external output unit 115. In a case where the CPU 108 determines that the imaging apparatus 100 is in the camera mode (YES in step S206), the processing proceeds to step S207. In a case where the CPU 108 determines that the imaging apparatus 100 is not in the camera mode (NO in step S206), the processing in FIG. 2 is ended.

In step S207, the CPU 108 refers to the mode information stored in the RAM 111, controls the image sensor 102 based on the mode information, and captures RAW data (RAW image) on a subject image. The captured RAW data is stored in the RAM 111.

In step S208, the CPU 108 refers to the mode information stored in the RAM 111 and determines whether the imaging apparatus 100 is in the HDMI RAW mode. The HDMI RAW mode is a mode in which the imaging apparatus 100 outputs RAW data captured in step S207 and having undergone γ processing in step S209 to an external sink via the external output unit 115. In a case where the CPU 108 determines that the imaging apparatus 100 is in the HDMI RAW mode (YES in step S208), the processing proceeds to step S209. In a case where the CPU 108 determines that the imaging apparatus 100 is not in the HDMI RAW mode (NO in step S208), the processing proceeds to step S211.

In step S209, the CPU 108 controls the image processing unit 103 and performs γ processing on the RAW data captured in step S207.

In step S210, the CPU 108 controls the image processing unit 103 and writes the RAW data having undergone the γ processing in step S208 to an HDMI output memory area in the RAM 111.

Figure 3A:
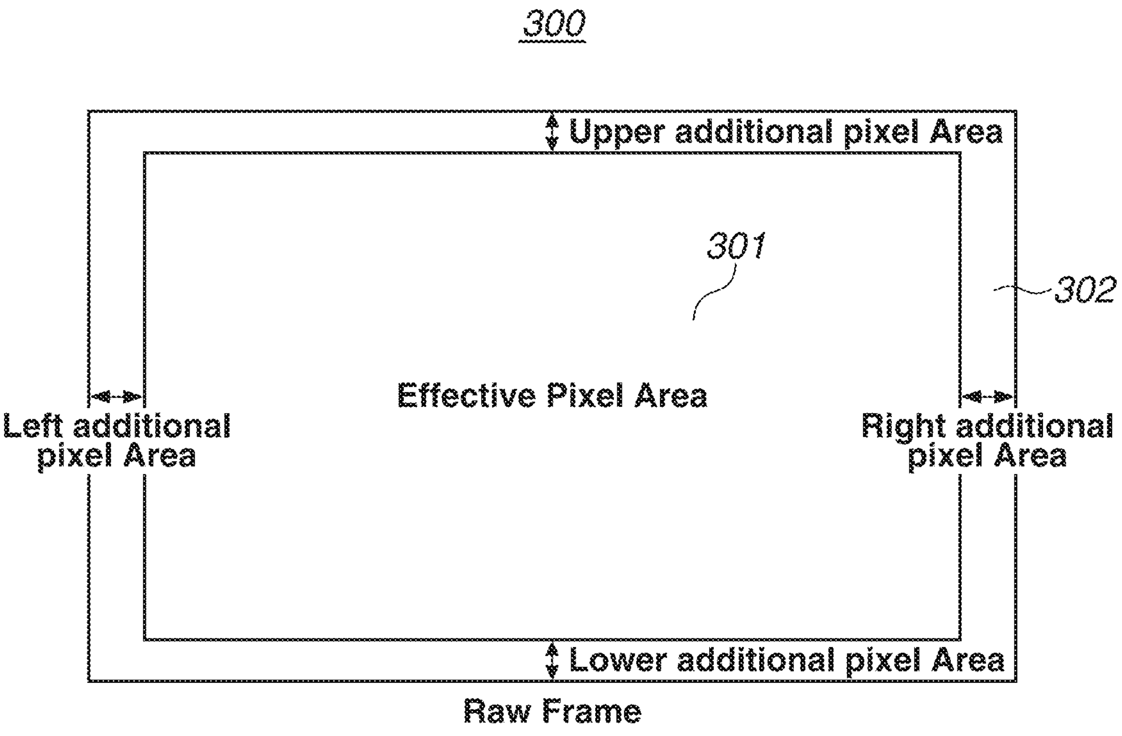
FIG. 3A is a diagram illustrating RAW data.

RAW data that is written to the RAM 111 is now described with reference to FIGS. 3A, 3B, and 4. In FIG. 3A, RAW data 300 is the entire RAW data written to the RAM 111 in step S210. The RAW data includes data of an effective pixel area 301 and data of an additional pixel area 302. The additional pixel area 302 is an area where several pixels are added to each of upper, lower, left, and right areas of the effective pixel area 301 as illustrated in FIG. 3A, and the pixels in this area are used in developing upper, lower, left, and right edges of the effective pixel area 301. Due to such a configuration, data that is written in step S210 includes an effective pixel area and additional pixel areas as illustrated in FIG. 3B. For example, in a case of 4K RAW data, data corresponding to 4120×2176 pixels in total, which is the sum of 4096×2160 pixels of an effective pixel area and 12 pixels of each of left and right additional pixel areas and 8 pixels of each of upper and lower additional pixel areas, is written to the RAM 111.

Figure 4:
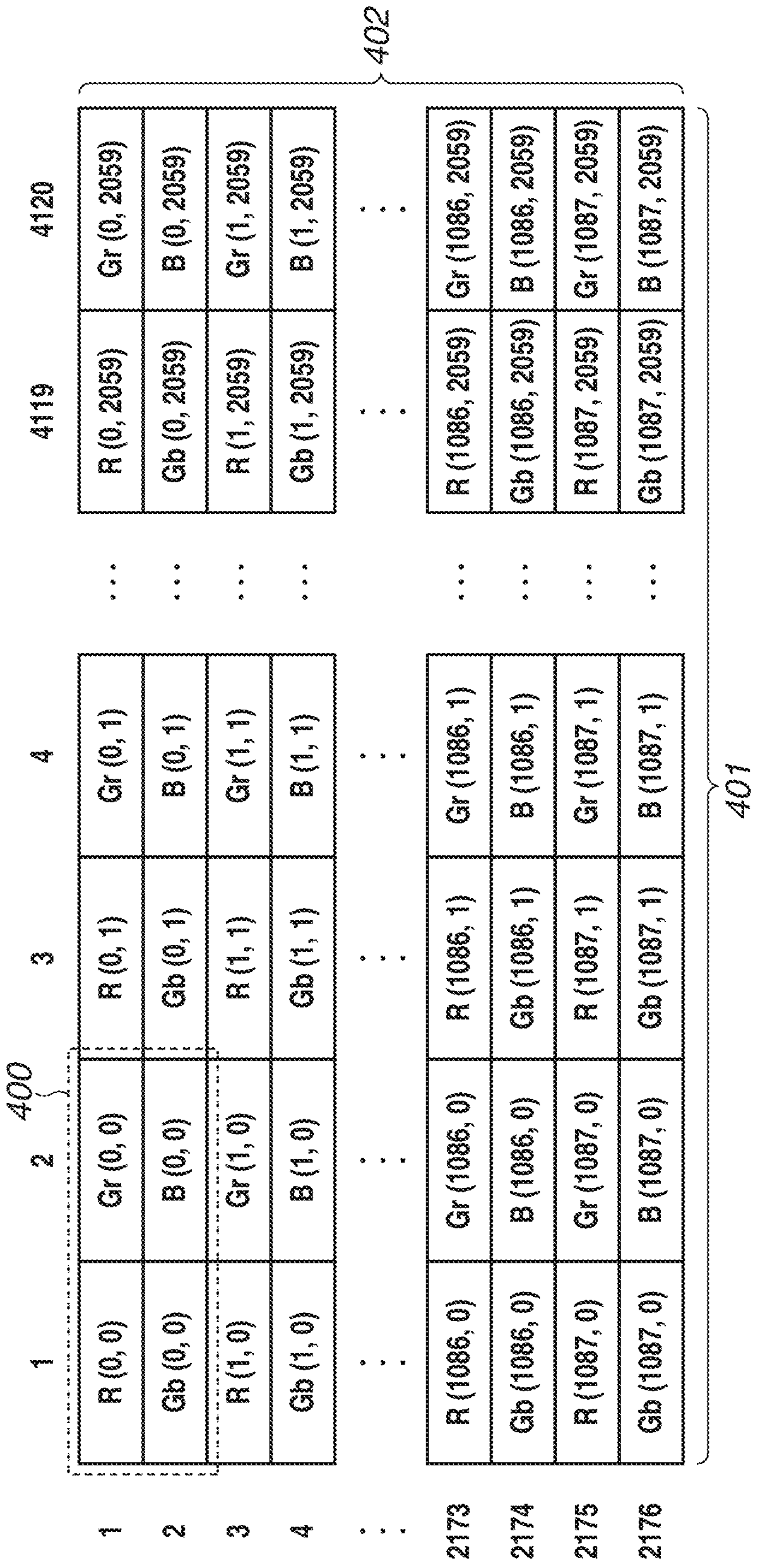
FIG. 4 is a diagram illustrating details of RAW data.

FIG. 4 is a diagram illustrating details of the RAW data that is written to the RAM 111 in step S210. In FIG. 4, as specified by 400, the RAW data includes Bayer arrays of R/Gr/Gb/B. In 4K RAW data, 2060 Bayer arrays (4120 pixels as pixel data) are arranged in a horizontal direction as specified by 401, and 1088 Bayer arrays (2176 pixels as pixel data) are arranged in a vertical direction as specified by 402. The data size is 4120 (horizontal)×2176 (vertical)×12 (bit depth)/8 (bits into bytes)=13447680 bytes.

Back to FIG. 2, in step S211, the CPU 108 controls the image processing unit 103 and performs RAW data correction processing on the RAW data captured in step S207. The RAW data correction processing includes pre-development lens correction processing (such as peripheral illumination correction processing and magnification chromatic aberration correction) and white balance. Data for use in the pre-development lens correction processing is stored in advance for each lens type in the ROM 110, and the CPU 108 determines parameters for the pre-development lens correction processing based on the stored data and the type of the lens unit 101 mounted on the imaging apparatus 100.

In step S212, the CPU 108 controls the image processing unit 103 and performs development processing on the image data having undergone the correction processing in step S211. The development processing includes processing such as Debayering, Y processing, and color blurring correction. The CPU 108 determines parameters for the color blurring correction processing based on the data stored in advance in the ROM 110 and the type of the lens unit 101 mounted on the imaging apparatus 100. The development processing is performed to convert the RAW data into YCC 4:2:2 format data. The YCC 4:2:2 format image data after the development processing is stored in the RAM 111.

In step S213, the CPU 108 controls the image processing unit 103 and performs development data correction processing, such as distortion correction, on the YCC 4:2:2 format data generated and stored in the RAM 111 in step S212. The CPU 108 determines parameters for the distortion correction based on the data stored in advance in the ROM 110 and the type of the lens unit 101 mounted on the imaging apparatus 100. The corrected development data (in YCC 4:2:2 format) corrected in step S213 is stored in the RAM 111.

In step S214, the CPU 108 refers to the mode information stored in the RAM 111 and determines whether the imaging apparatus 100 is in the HDMI RAW mode. In a case where the CPU 108 determines that the imaging apparatus 100 is in the HDMI RAW mode (YES in step S214), the processing proceeds to step S215. In a case where the CPU 108 determines that the imaging apparatus 100 is not in the HDMI RAW mode (NO in step S214), the processing proceeds to step S216.

In step S215, the CPU 108 writes metadata corresponding to the RAW data written to the RAM 111 in step S210 to the area after the RAW data. The metadata includes, for example, data for use in correction processing on the corresponding RAW data.

The HDMI output memory area generated in steps S210 and S215 will be described below with reference to FIGS. 5 to 7.

Figure 5:
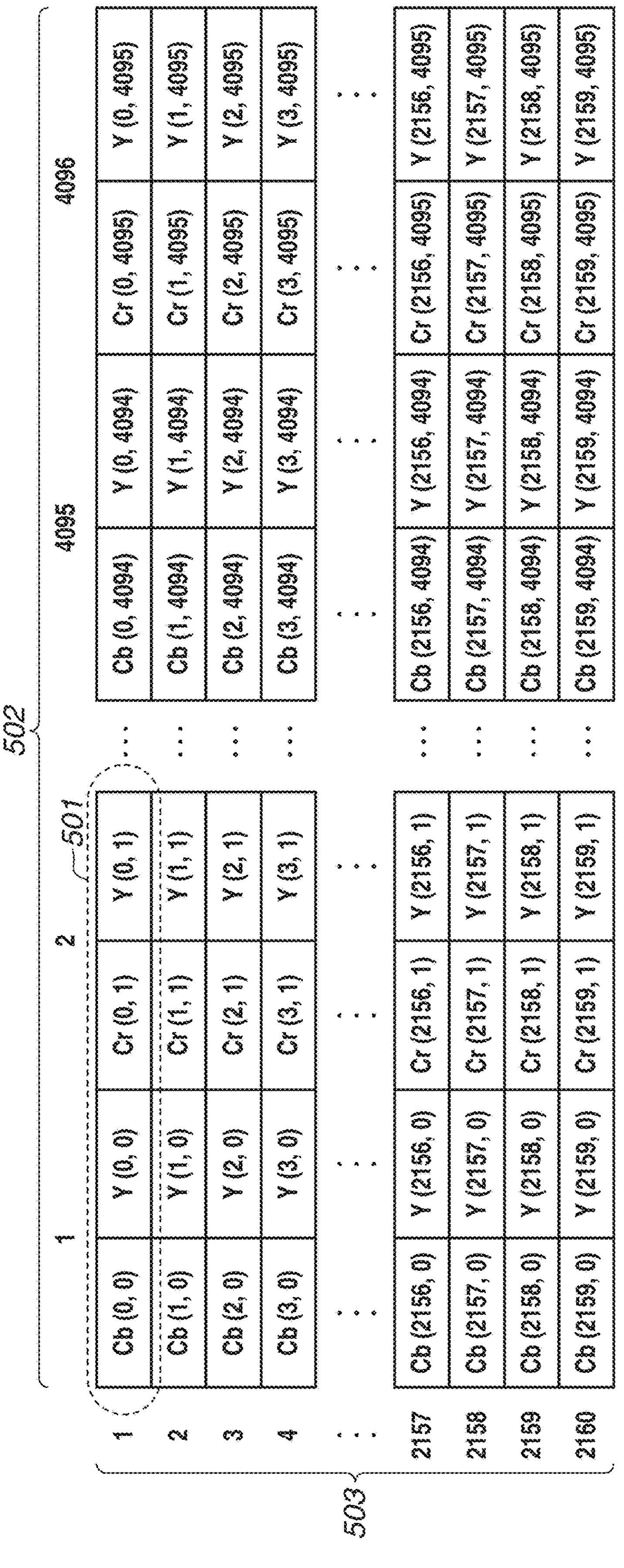
FIG. 5 is a diagram illustrating a high-definition multimedia interface (HDMI®) output memory area.

FIG. 5 is a diagram illustrating an HDMI output memory area in a case where 12-bit video data in YCC 4:2:2 format with 4096×2160 pixels is output with a video signal compliant with the HDMI standard. As illustrated in FIG. 5, this memory area 501 includes an image area of 4096 pixels in a horizontal direction as specific by 502 by 2160 pixels in a vertical direction as specified by 503. In FIG. 5, image data is structured in units of two pixels (one piece of Cb data and one piece of Cr data for two Y data) as specified by 501, and each data item Y, Cb, and Cr is 12 bits in size. The data size of each line (horizontal direction) in the HDMI output memory area is 4096 (horizontal)×2 (four items of data [two Ys, one Cb, one Cr) in two pixels)×12 (bit depth)/8 (bits into bytes)=12288 bytes. The data size of the entire HDMI output memory area is 4096 (horizontal)×2160 (vertical)×2 (four data items in two pixels)×12 (bit depth)/8 (bits into bytes)=26542080 bytes.

Figure 6:
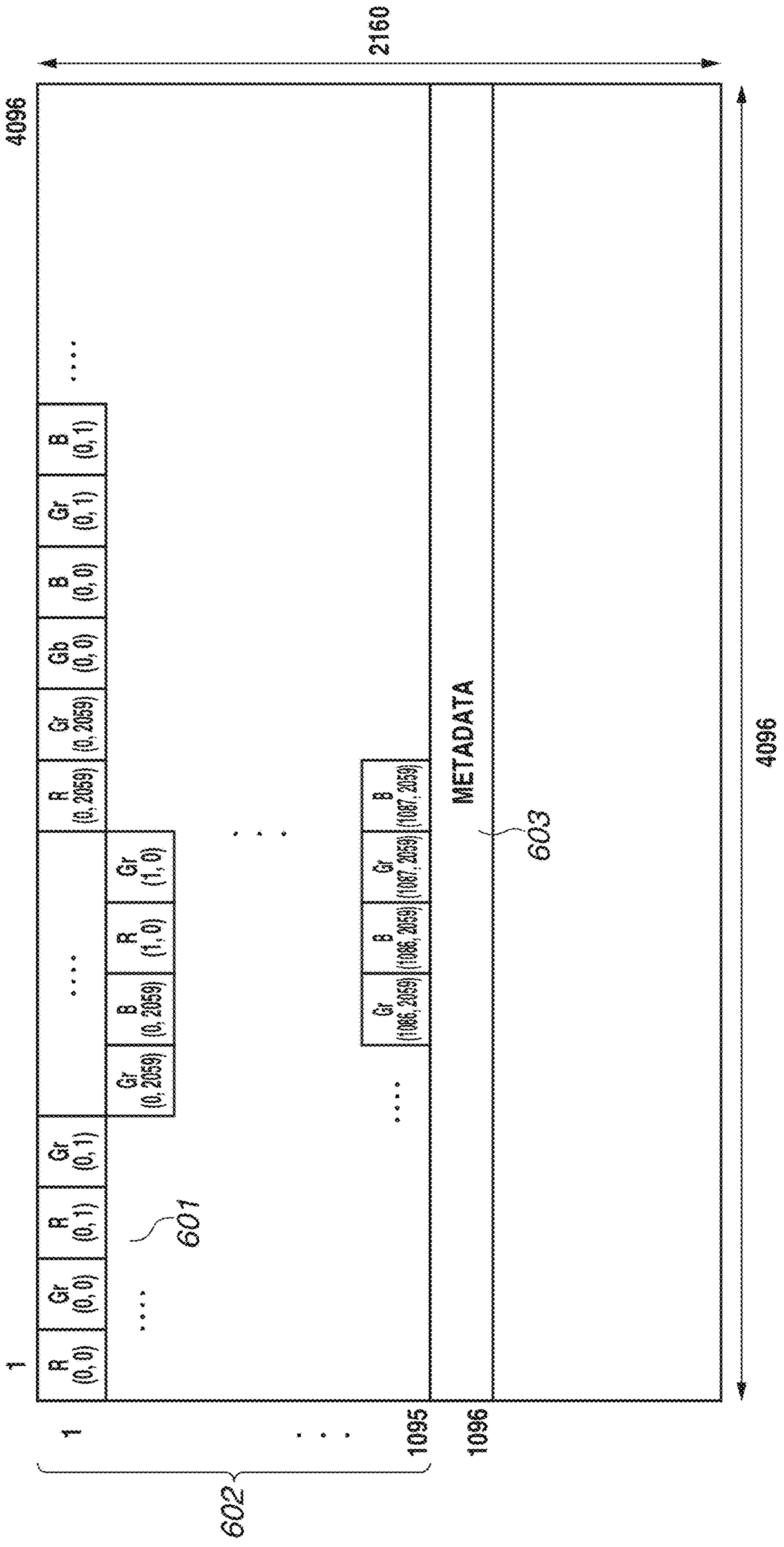
FIG. 6 is a diagram illustrating a state where RAW data is stored in the HDMI output memory area.

FIG. 6 is a diagram illustrating a state where RAW data is stored in step S210 and metadata corresponding to the RAW data is stored in step S215 in the HDMI output memory area illustrated in FIG. 5. The size of the RAW data is 4120 (horizontal)×2176 (vertical)×12 (bit depth)/8 (bits into bytes)=13447680 bytes described above with reference to FIG. 4.

In FIG. 6, Bayer data items (R and Gr data items in the first row, Gr and B data items in the second row) are arranged without gaps in an image area for arranging Cb, Y, Cr, and Y data sequences in the HDMI output memory area as specified by 601. The size of the RAW data is 13447680 bytes, and the data size of each line in the HDMI output memory area is 12288 bytes. Therefore, 1095 lines (13447680/12288=1094.375) in the HDMI output memory area can store the RAW data with a bit depth of 12 bits for 4120×2176 pixels as specified by 602 in FIG. 6. The area (lines 1096 to 2160 lines in the HDMI output memory area) after the RAW data becomes an available space, so that metadata corresponding to the RAW data arranged in the image area up to line 1095 is arranged in the area as specified by 603. For example, the metadata is data for use in correction processing for the corresponding RAW image and includes γ data (γ in step S209) of RAW data. For example, the metadata includes parameters used in the development processing and correction processing in the imaging apparatus 100 (parameters for the RAW data correction processing in step S211, parameters for the development processing in step S212, parameters for the development data correction processing in step S213).

FIG. 6 illustrates a case where RAW data that is written in step S210 fits in the HDMI output memory area. A contrasting case where RAW data that is written in step S210 does not fit in the HDMI output memory area will be described below with reference to FIG. 7.

Figure 7:
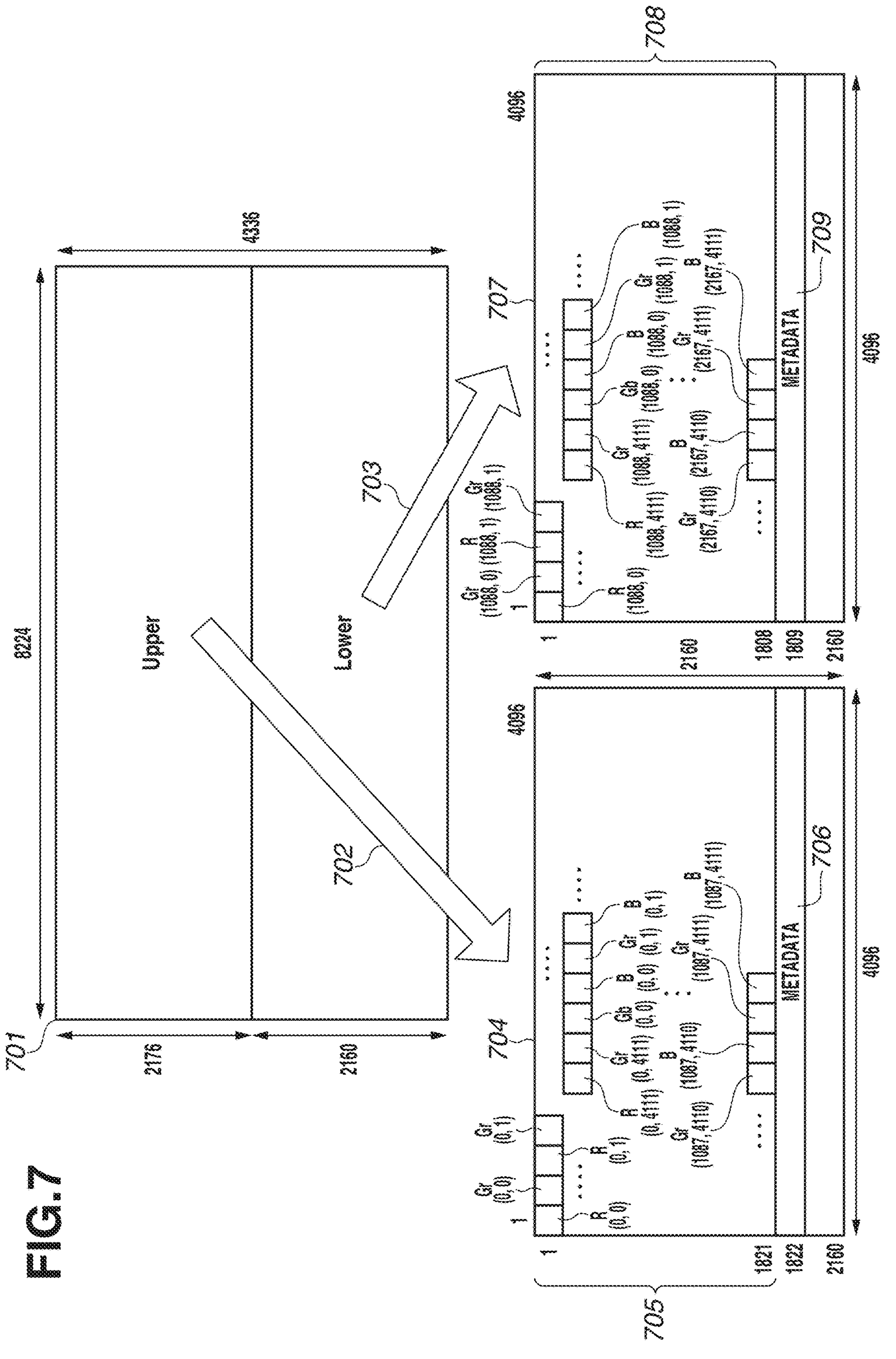
FIG. 7 is a diagram illustrating a state where RAW data is stored in the HDMI output memory area.

In FIG. 7, RAW data 701 has a bit depth of 10 bits for 8224×4336 pixels. The inside includes R, Gr, Gb, and B Bayer arrays as described above with reference to FIG. 4. The data size of the RAW data is 8224 (horizontal)×4336 (vertical)×10 (bit depth)/8 (bits into bytes)=44574080 bytes. Therefore, the RAW data does not fit in the memory area (26542080 bytes) corresponding to a bit depth of 12 bits for 4096×2160 pixels. Thus, the RAW data is divided into upper and lower halves, and the upper and lower halves are stored in two frames of the HDMI output memory area. For example, the RAW data up to line 2176 is arranged in a first frame as specified by 702, and the RAW data of the remaining lines is arranged in a second frame as specified by 703 in FIG. 7.

In FIG. 7, an HDMI output memory area 704 (first frame) is an HDMI output memory area where the RAW data is arranged. The data size of the upper half (corresponding to 2176 lines) of the RAW data with a bit depth of 10 bits for 8224×4336 pixels is 8224 (horizontal)×2176 (vertical)×10 (bit depth)/8 (bits into bytes)=22369280 bytes. Therefore, the upper half of the RAW data can be stored in 1821 lines (22369280/12288=1820.41) in the memory area (image area) corresponding to a bit depth of 12 bits for 4096×2160 pixels as specified by 705. Thus, the metadata described above with reference to FIG. 6 is written to the HDMI output memory area (first frame) from line 1822 onward as specified by 706.

In an HDMI output memory area 707 (second frame), the RAW data is arranged. The data size of the lower half (corresponding to 2160 lines) of the RAW data with a bit depth of 10 bits for 8224×4336 pixels is 8224 (horizontal)×2160 (vertical)×10 (bit depth)/8 (bits into bytes)=22204800 bytes. Therefore, the lower half of the RAW data can be stored in 1808 lines (22204800/12288=1807.031) in the memory area with a bit depth of 12 bits for 4096×2160 pixels as specified by 708. Thus, the metadata described above with reference to FIG. 6 is written to the output memory area (second frame) from line 1809 ongoing as specified by 709. Thus, in a case where RAW data does not fit in an HDMI output memory area, the RAW data is divided into upper and lower halves, and then the RAW data is arranged in the HDMI output memory area.

Back to FIG. 2, in step S216, the CPU 108 controls the display resize unit 104, resizes the corrected development data generated in step S213, and writes the resized data to an HDMI memory area in the RAM 111. The data written to the RAM 111 herein is the YCC 4:2:2 format data described above with reference to FIG. 5.

In step S217, the CPU 108 controls the display resize unit 104, resizes the corrected development data generated in step S213, and writes the resized data to a display output memory area in the RAM 111. The data written to the RAM 111 here is the YCC 4:2:2 format data described above with reference to FIG. 5.

In step S218, the CPU 108 outputs, to the display unit 107, the display output data written to the display output memory area in the RAM 111 in step S217. Since the display unit 107 supports the display of YCC 4:2:2 format image signals, the image captured in step S207 is displayed on the display unit 107.

In step S219, the CPU 108 controls the external output unit 115 and outputs the HDMI output data written to the HDMI output memory area in the RAM 111 to an external device with a video signal compliant with the HDMI standard. In a case where the imaging apparatus 100 is in the HDMI RAW mode, the RAW data is written to the HDMI output memory area in step S210, and the metadata corresponding to the RAW data is written to the HDMI output memory area in step S215. Thus, in a case where the imaging apparatus 100 is in the HDMI RAW mode, a signal in which the RAW data and the metadata are mapped (or stored) is output to an image area in a video format in YCC 4:2:2 format (12 bits). The video format in YCC 4:2:2 format (12 bits) is defined in the HDMI standard. The video format may also be referred to as a transmission format or an output format. In a case where the imaging apparatus 100 is in a mode other than the HDMI RAW mode, the corrected development data resized in step S216 is written to the HDMI output memory area. Thus, in a case where the imaging apparatus 100 is in a mode other than the HDMI RAW mode, a video signal in YCC 4:2:2 format is output.

Thereafter, the operations from step S201 are executed repeatedly until it is determined that no HDMI connection is established in step S204 or until it is determined that the imaging apparatus 100 is not in the camera mode in step S206.

Figure 8:
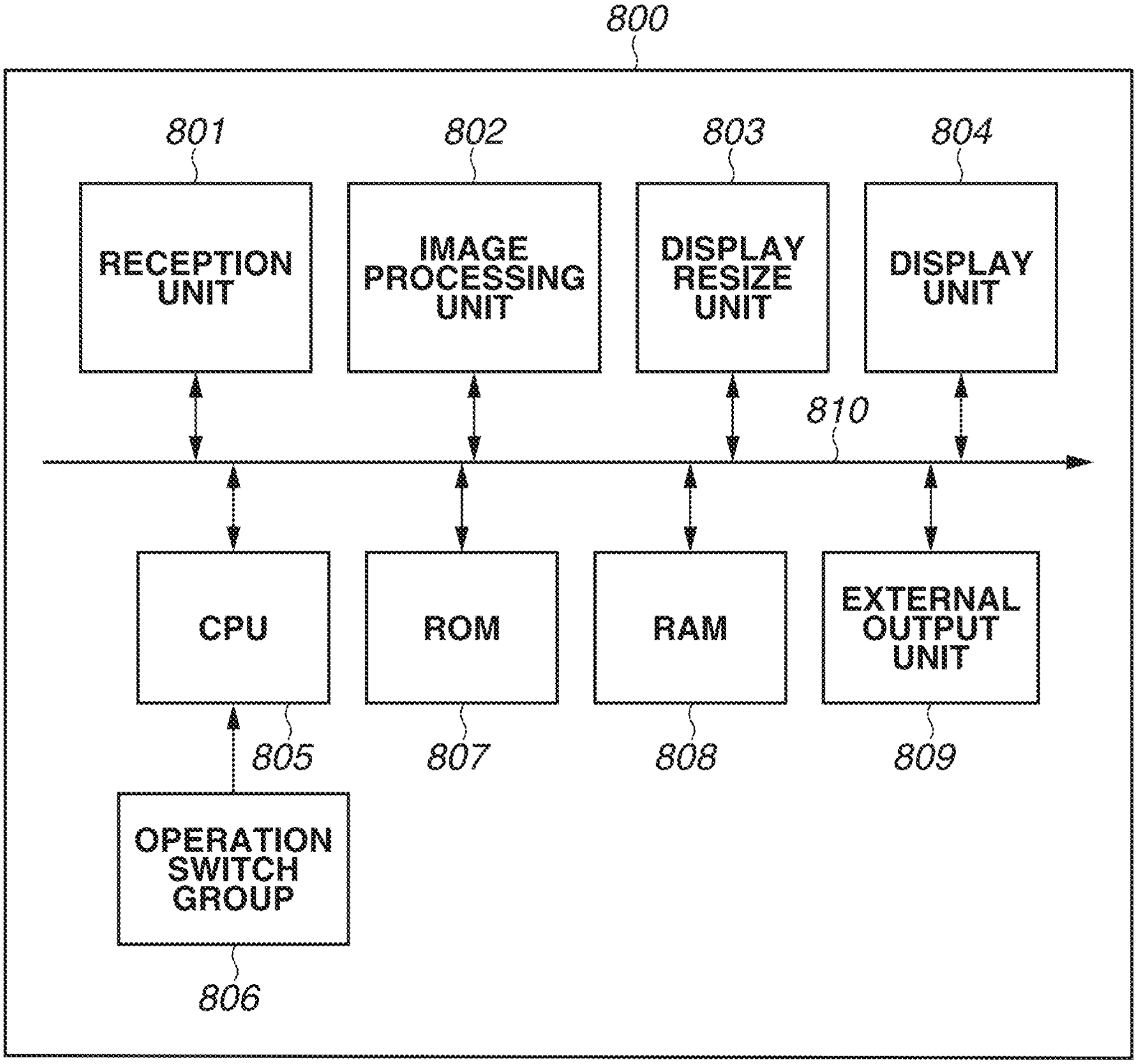
FIG. 8 is a block diagram illustrating components of an image reception device 800 according to the first exemplary embodiment.

Next, an image reception device configured to receive video signals that are output from the imaging apparatus 100 and are compliant with the HDMI standard and perform displaying will be described below. FIG. 8 is a block diagram illustrating components of an image reception device 800 according to the first exemplary embodiment.

A reception unit 801 receives signals compliant with the HDMI standard. A video signal received by the reception unit 801 becomes an input to the image reception device 800. Image data received by the reception unit 801 is stored in a RAM 808.

An image processing unit 802 performs various types of image processing on image data received by the reception unit 801. The image processing unit 802 stores the image data having undergone image processing in the RAM 808.

A display resize unit 803 resizes image data stored in the RAM 808 and generates display image data to output a video signal to a display unit 804 or an external output unit 809. The display resize unit 803 stores the generated display image data in the RAM 808.

The display unit 804 is a display member for displaying the display image data stored in the RAM 111. The display unit 804 is, for example, a liquid crystal panel. A CPU 805 controls the entire image reception device 800.

An operation switch group 806 is an operation member with which a user inputs operations.

A ROM 807 is, for example, a flash ROM and stores programs that the CPU 108 executes. Some area of the ROM 807 is used to maintain a system state for backup.

The RAM 808 is a volatile memory used as workspace by the CPU 805 and the image processing unit 802.

The external output unit 809 externally outputs the display image data output to the RAM 808 by the image processing unit 802. The external output unit 809 is, for example, an interface compliant with the HDMI standard or the SDI standard. The external output unit 809 is capable of outputting display image data with a signal conforming to the 4K60P or 2K60P standard. A bus 810 is a bus via which the components of the image reception device 800 exchange data.

Next, a process of receiving image data with a video signal compliant with the HDMI standard and performing development and performing display processing on the image data by the image reception device 800 according to the first exemplary embodiment will be described below with reference to FIG. 9. FIG. 9 is a flowchart illustrating a process of the image reception device 800 according to the first exemplary embodiment. The CPU 805 of the image reception device 800 executes programs stored in the ROM 807 to control processing in the flowchart in FIG. 9.

In step S901, the CPU 805 controls the reception unit 801 and receives a signal compliant with the HDMI standard. The received signal is stored in the RAM 808. While the image data received in step S901 may be YCC image data or RAW data (RAW image) described above, a case where RAW data is received will be described below.

In step S902, the CPU 805 controls the image processing unit 802 and performs inverse γ processing on the RAW data stored in the RAM 808. Information about γ applied to the RAW data may be information about the metadata corresponding to the RAW data. The information may be information notified from a source device using a Vender-Specific Info Frame (VSIF) indicating additional information about the video signal.

In step S903, the CPU 805 determines whether the corresponding metadata is added to the RAW data stored in the RAM 808. In a case where the CPU 805 determines that the corresponding metadata is added (YES in step S903), the processing proceeds to step S904. In a case where the CPU 805 determines that the corresponding metadata is not added (NO in step S903), the processing proceeds to step S909.

In step S904, the CPU 805 controls the image processing unit 802 and performs pre-development lens correction processing (such as peripheral illumination correction processing and magnification chromatic aberration correction) on the RAW data stored in the RAM 808. Data for use in the correction processing is stored in the metadata added to the RAW data.

In step S905, the CPU 805 controls the image processing unit 802 and performs white balance processing on the RAW data having undergone the correction processing in step S904.

In step S906, the CPU 805 controls the image processing unit 802 and performs development processing on the data corrected in step S905. The development processing is, for example, Debayering. The development processing is performed to convert the RAW data into YCC 4:2:2 format data.

In step S907, the CPU 805 controls the image processing unit 802 and performs post-development lens correction processing on the data having undergone the development processing in step S906. The post-development lens correction processing includes processing such as color blurring correction and distortion correction. Data for use in the correction processing is stored in the metadata added to the RAW data.

In step S908, the CPU 805 controls the image processing unit 802 and performs display image processing, such as γ correction and look-up table (LUT). The CPU 805 stores the data having undergone the display image processing as development data in the RAM 808.

In step S909, the CPU 805 controls the image processing unit 802 and performs white balance processing on the RAW data stored in the RAM 808.

In step S910, the CPU 805 controls the image processing unit 802 and performs development processing on the data corrected in step S909. The development processing is, for example, Debayering. The development processing is performed to convert the RAW data into YCC 4:2:2 format data.

In step S911, the CPU 805 controls the image processing unit 802 and performs display image processing, such as γ correction and LUT. The CPU 805 stores the data having undergone the display image processing as development data in the RAM 808. The development data stored here is data that has not undergone correction processing, such as distortion correction, because the operation in step S904 and the operation in step S907 described above are not performed on the data.

In step S912, the CPU 805 controls the display resize unit 803, resizes the development data stored in the RAM 808, and writes the resized data as HDMI output data to the RAM 808.

In step S913, the CPU 805 controls the display resize unit 803, resizes the development data stored in the RAM 808, and writes the resized data to the display output memory area in the RAM 111.

In step S914, the CPU 805 outputs, to the display unit 804, the display output data generated and written to the display output memory area in the RAM 111 in step S913, and ends the processing. The data output here in a case where metadata is added to the RAW data received in step S901 as described above is image data having undergone lens correction processing, such as distortion correction, using the metadata. On the other hand, the data output here in a case where no metadata is added to the RAW data received in step S901 is image data not having undergone lens correction processing.

As described above, according to the first exemplary embodiment, the imaging apparatus 100 maps RAW data (RAW image) and metadata corresponding to the RAW data in the image area in the video format in YCC 4:2:2 format (12 bits). The imaging apparatus 100 outputs the image data and the metadata that are mapped in the image area in the video format in YCC 4:2:2 format (12 bits) with a video signal compliant with the HDMI standard. This makes it possible to externally output a large amount of image data and metadata corresponding to the image data without causing image degradation.

Second Exemplary Embodiment

Various functions, processing, or methods according to the first exemplary embodiment described above may be realized also by a personal computer, a micro-computer, a Central Processing Unit (CPU), or a micro-processor by executing a program. According to a second exemplary embodiment, a personal computer, a micro-computer, a Central Processing Unit (CPU), or a micro-processor will be referred to as "computer X" hereinafter. According to the second exemplary embodiment, a program for controlling the computer X and realizing various functions, processing, or methods according to the first exemplary embodiment described above will be referred to as “program Y”.

The various functions, processing, or methods according to the first exemplary embodiment described above are realized by the computer X by executing the program Y. In this case, the program Y is supplied to the computer X via a computer-readable storage medium. A computer-readable storage medium according to the second exemplary embodiment includes at least one of a hard disk drive, a magnetic storage device, an optical storage device, a magneto-optical storage device, a memory card, a volatile memory, and a non-volatile memory. The computer-readable storage medium according to the second exemplary embodiment is a non-transitory storage medium.

The present invention is not limited to the exemplary embodiments described above, and various changes and modifications are possible without departing from the spirit and scope of the present invention. Thus, the following claims are attached to disclose the scope of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:

one or more processors; and at least one memory storing one or more programs including executable instructions, which when executed by the one or more processors, cause the imaging apparatus to perform operations comprising:

generating a RAW image;

storing the RAW image into an image area in a transmission format in luminance-chrominance-chrominance (YCC) 4:2:2 format, the image area having a data size larger than a data size of the RAW image;

determining metadata corresponding to the RAW image;

storing the metadata in the image area in the YCC 4:2:2 format, the metadata being written to a specified portion of the image area based on the data size of the RAW image written to the image area in the YCC 4:2:2 format; and outputting the RAW image and the metadata in the image area in the transmission format in YCC 4:2:2 format.

2. The imaging apparatus according to claim 1, wherein the operations comprise arranging the metadata in an available space where the RAW image is not arranged in the image area in the transmission format in YCC 4:2:2 format.

3. The imaging apparatus according to claim 1, wherein the operations comprise arranging the metadata in an area in which the RAW image has been arranged.

4. The imaging apparatus according to claim 1, wherein the operations comprise outputting the RAW image and the metadata in the image area in the transmission format in YCC 4:2:2 format with a video signal compliant with a high-definition multimedia interface (HDMI) standard.

5. The imaging apparatus according to claim 1, wherein the metadata includes data for use in correction processing for the RAW image.

6. The imaging apparatus according to claim 1, wherein the operations further comprise:

generating a second RAW image having a data size larger than the data size of the image area in the transmission format in YCC 4:2:2 format;

dividing data of the second RAW image into at least first data and second data from the data of the second RAW image to generate a third RAW image based on the first data and a fourth RAW image based on the second data;

store the third RAW image and metadata corresponding to the third RAW image in a first frame of the image area in the transmission format in YCC 4:2:2 format, the first frame having a data size larger than a data size of the third RAW image; and store the fourth RAW image and metadata corresponding to the fourth RAW image in a second frame of the image area in the transmission format in YCC 4:2:2 format, the second frame having a data size larger than a data size of the fourth RAW image.

7. The imaging apparatus according to claim 6, wherein the dividing the data of the second RAW image comprises dividing the data of the second RAW image into upper and lower image halves.

8. The imaging apparatus according to claim 1, wherein the operations comprise, in a first mode, outputting the RAW image and the metadata, and in a second mode, outputting development data obtained by performing development processing on the RAW image.

9. A control method comprising:

generating a RAW image;

storing the RAW image into an image area in a transmission format in luminance-chrominance-chrominance (YCC) 4:2:2 format, the image area having a data size larger than a data size of the RAW image;

determining metadata corresponding to the RAW image;

storing the metadata in the image area in the YCC 4:2:2 format, the metadata being written to a specified portion of the image area based on the data size of the RAW image written to the image area in the YCC 4:2:2 format; and outputting the RAW image and the metadata in the image area in the transmission format in YCC 4:2:2 format.

10. A non-transitory storage medium storing a program for causing a computer of an imaging apparatus to perform:

generating a RAW image;

storing the RAW image into an image area in a transmission format in luminance-chrominance-chrominance (YCC) 4:2:2 format, the image area having a data size larger than a data size of the RAW image;

determining metadata corresponding to the RAW image;

storing the metadata in the image area in the YCC 4:2:2 format, the metadata being written to a specified portion of the image area based on the data size of the RAW image written to the image area in the YCC 4:2:2 format; and outputting the RAW image and the metadata in the image area in the transmission format in YCC 4:2:2 format.

* * * * *